Patented Mar. 21, 1950

2,501,144

UNITED STATES PATENT OFFICE 2,501,144

UNSATURATED ALDEHYDES AND PREPARATION THEREOF

Robert H. Saunders, Oxford, Pa., assignor to Hercules Powder Company, Wilmington, Del., a corporation of Delaware No Drawing. Application December 19, 1947, Serial No. 792,849

6 Claims. (Cl. 260—601)

This invention relates to novel acyclic aldehydes. More particularly it relates to alpha-alkenyl-substituted unsaturated aldehydes and to the method of their preparation.

The preparation of the higher aliphatic unsaturated aldehydes from simpler compounds has in the past involved long, complicated and costly syntheses. As a result such aldehydes have not been considered as raw materials for chemical synthesis or as commercial products.

Now in accordance with this invention, novel alpha-alkenyl-substituted unsaturated aldehydes are made available by the process of heating an unsaturated aldehyde with an unsaturated alcohol under acetal-forming conditions and heating the acetal of the alpha-beta-unsaturated aldehyde so produced at a temperature within the range of about 150° C. and about 300° C., and recovering an alpha-alkenyl-alpha,beta-unsaturated aldehyde from the products.

The invention expressed by this broad statement is illustrated further by means of the following examples wherein all parts and percentages given are by weight.

Example I

Diallyl acetal of crotonaldehyde was made by heating 1107 parts allyl alcohol and 315 parts crotonaldehyde in a distillation apparatus with 25 plate bubble cap column and slowly distilling off the water as an azeotrope with allyl alcohol over a 23-hour period. This azeotrope boils at about 88.2° C. After removal of the water the last of the allyl alcohol was removed under reduced pressure. The temperature of the distillation pot during the slow distillation was about 100–105° C. The diallyl acetal of crotonaldehyde was separated in the distillation under reduced pressure as the fraction boiling at 90–100° C. (27 mm. pressure). Its refractive index (20° C.) was 1.4459.

To 100 parts diallyl acetal of crotonaldehyde in a distillation apparatus was added 0.25 part of acid-washed bentonite. This mixture was then heated so that the pot temperature was held at about 195–205° C. for about two hours during which time volatile material was distilled off. The volatile material yielded on redistillation substantially pure allyl alcohol (B. P. 97° C.), unchanged diallyl acetal of crotonaldehyde and alpha-allyl-crotonaldehyde (B. P. 35–75° C./15 mm. pressure) which were separated by distillation under reduced pressure. The alpha-allyl crotonaldehyde showed an ultraviolet absorption band at 222 m$\mu$ with an extinction coefficient of 34 and formed a crystalline 2,4-dinitrophenylhydrazone M. P. 145–147° C. having the empirical formula $C_{13}H_{14}N_4O_4$.

Example II

The bis(1,2-dimethylallyl) acetal of crotonaldehyde was made by heating 94 parts 1,2-dimethylallyl alcohol (methyl isopropenyl carbinol) and 30 parts crotonaldehyde in a distillation apparatus with 65 parts benzene at 110–115° C. under atmospheric pressure. Water distilled over as an azeotrope with the benzene and was automatically separated while the benzene was returned to the system. The benzene and excess 1,2-dimethylallyl alcohol were then distilled off and the bis(1,2-dimethylallyl) acetal of crotonaldehyde was isolated as a fraction boiling at 115–145° C. (18 mm. pressure) amounting to 30 parts. This fraction had a refractive index (25° C.) 1.4465.

Bis(1,2-dimethylallyl) acetal of crotonaldehyde (15 parts) prepared as above was placed in a distillation apparatus and heated at a pot temperature of about 240° C. at atmospheric pressure until 3.25 parts 1,2-dimethylallyl alcohol had distilled. The residue was then distilled under reduced pressure to obtain 5.5 parts 3-formyl-5-methyl-2,5-heptadiene boiling at 90° C. (18 mm. pressure). This alkenyl-substituted unsaturated aldehyde showed an ultraviolet absorption band at 226 m$\mu$ with an extinction coefficient of 65. It formed a 2,4-dinitrophenylhydrazone M. P. 149–152° C., having the empirical formula $$C_{15}H_{18}N_4O_4$$

Example III

Dimethallyl acetal of crotonaldehyde was prepared by heating 105 parts crotonaldehyde with 432 parts methallyl alcohol in a distillation apparatus with a 25 plate bubble cap column having a water separator at the column head. The mixture was refluxed for 18 hours at about 125° C. pot temperature and the water formed in the reaction was separated at the head of the column with continuous return of the organic fraction. At the end of the refluxing period during which water was being evolved, the dimethallyl acetal of crotonaldehyde was separated by distillation under reduced pressure. The yield was 190 parts of a product boiling at 95–100° C. (17 mm. pressure).

One hundred parts of this dimethallyl acetal of crotonaldehyde was heated in a distillation apparatus with 10 parts alumina and slowly distilled through a distilling column. The pot temperature was about 210° C. The distillate was redistilled to separate 27 parts methallyl alcohol fraction boiling at about 114° C. and 27 parts alpha-methallyl crotonaldehyde fraction boiling at 59.5–61° C. (11 mm. pressure) from unchanged dimethallyl acetal of crotonaldehyde which also distilled. The alpha-methallyl crotonaldehyde showed an ultraviolet absorption band at 226 m$\mu$ with an extinction coefficient of 83 and formed a 2,4-dinitrophenylhydrazone M. P. 147-149° C., having the empirical formula $C_{14}H_{16}N_4O_4$.

Example IV

A mixture of 210 parts crotonaldehyde and 864 parts methallyl alcohol was heated together in a stainless steel autoclave at 200° C. for 10 hours. The cooled mixture as taken from the autoclave was shown by analysis to contain 3.29% water, corresponding to 34.25 parts water, and about 5.5% crotonaldehyde. The mixture was distilled in vacuo. The first fraction boiling up to 40° C. (15 mm. pressure) amounted to 500 parts. The second fraction boiling over a range from about 40° C. to about 115° C. (15 mm. pressure) amounted to 349 parts of which about 10% was alphamethallyl crotonaldehyde. The mixture also contained some methallyl alcohol, methallyl crotonate, and at least one other material showing no absorption in the ultraviolet region.

Example V

In a distillation apparatus fitted with a thermometer dipping into the pot, a dropping funnel, and a distillation arm was placed 100 parts dibutyl phthalate to act as a solvent and a distillation heel. The dibutyl phthalate in the pot was heated to about 210° and held at that temperature while 95 parts dimethallyl acetal of crotonaldehyde was added dropwise over a 3-hour period. After all of the acetal had been added, the pot temperature was raised to 260° C. to aid in removing all of the product. The distillate amounted to 76 parts of product having an extinction coefficient of 48.3 at 222 m$\mu$. Based on the extinction coefficient of pure alpha-methallyl crotonaldehyde of 83 at 222 m$\mu$, this product contained 44.3 parts methallyl crotonaldehyde or 73.9% of theoretical.

The alkenyl-substituted unsaturated aldehydes of this invention as illustrated by the above examples may be represented by the following general formula

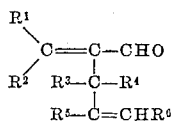

wherein the R groups are radicals selected from the group consisting of hydrogen and alkyl radicals having not more than four carbon atoms. The acetals of alpha,beta-unsaturated aldehydes which are pyrolyzed to alkenyl-substituted aldehydes of this formula have the following general formula

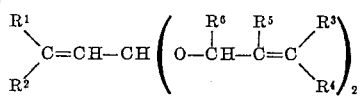

The acetals of a formula of this type are readily prepared by heating an unsaturated aldehyde of the general formula

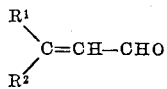

with an unsaturated alcohol of the formula

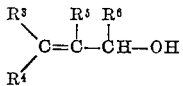

at a temperature within the range of about 80° C. and about 200° C. and the reaction is carried to completion by continuous removal of either water or the acetal formed in the reaction.

While the temperature for acetal formation may be within the range of about 80° C. to about 200° C., the preferred temperature for optimum yield of acetal is within the range of about 80° C. to about 140° C. When the temperature of reaction between the alcohol and the unsaturated aldehyde is above about 150° C., acetal formation takes place smoothly but the product has been found to be rich in the alkenyl-substituted unsaturated aldehydes of this invention formed as a result of pyrolysis, and the yield of acetal is proportionately diminished thereby.

Thus, at the higher temperature an alkenyl-substituted unsaturated aldehyde of this invention may also be produced in one step from an unsaturated aldehyde and an unsaturated alcohol of the above general formulas. The one-step process is carried out by heating the unsaturated aldehyde and the unsaturated alcohol at a temperature within the range of about 150° C. and about 300° C., and recovering the alpha-alkenyl-substituted unsaturated aldehyde from the products.

Suitable unsaturated aldehydes of the above general formula useful in this invention includes crotonic aldehyde, 2-methyl-2-pentenal-1, 2-ethyl-2-hexenal-1, 2,4-dimethyl-2-pentenal-1, 3-methyl-2-butenal-1, 3-methyl-2-hexenal-1, and the like. Such aldehydes are readily prepared by aldol condensation of simple aldehydes with similar or dissimilar aldehydes and ketones followed by dehydration of the aldol produced.

Suitable unsaturated alcohols of the above general formula useful in this invention include allyl alcohol, methyl isopropenyl carbinol, methallyl alcohol, crotyl alcohol, 3-hexenol-2, 4-methyl-3-pentenol-2, 2-ethyl-2-hexenol and the like. Such alcohols are readily prepared by reduction of the corresponding aldehydes.

Both acetal formation and pyrolysis of the acetals may be effected in batch or continuous process. In the batch process for preparation of the acetal, the water may be removed continuously to increase the yield of acetal. This may be accomplished best by azeotropic distillation using a low boiling organic liquid such as benzene, ethylidene chloride, diisopropyl ether, ethyl acetate, and the like as azeotropic agents. In the batch process for preparing the unsaturated-alkenyl substituted unsaturated aldehydes from the unsaturated alcohol and unsaturated aldehydes, the water need not be continuously removed, since the pyrolysis of the acetal as it is formed likewise effectively shifts the equilibrium in the acetal-forming reaction and the reaction may be carried to completion without physical separation of the products of the reaction. Thus, the unsaturated alcohol and the unsaturated aldehyde may be heated in an autoclave as in Example IV to obtain a reaction mixture containing water and the alpha-alkenyl-substituted unsaturated aldehyde along with any unreacted unsaturated aldehyde and unsaturated alcohol. The water formed as an end product is sufficient to hinder the formation of acetals from the alkenyl-substituted unsaturated aldehyde produced in the pyrolysis, although it may not entirely prevent the formation of such acetals if a large excess of the alcohol is also present.

Both of the above-described batch processes may be carried out equally well by continuously passing the reagents through a heated tube in the liquid phase. In a continuous process better control of the contact time is possible and overheating with subsequent polymerization of the unsaturated compounds is minimized. Such a continuous process is preferred when pyrolyzing at temperatures above about 250° C. In the acetal formation process the use of water absorbents such as silica gel or alumina favor the yield by removal of water.

The pyrolysis may also be carried out in the presence of a high boiling inert diluent such as dibutyl phthalate, dimethyl phthalate, decalin, tetralin, and the like. The acetal may either be added gradually to the diluent as in Example V or the acetal and diluent may be passed in admixture through the reaction zone. The diluent should have a boiling range outside that of the products so that separation may be readily made by distillation. Ordinarily the ratio of diluent to acetal in the heating zone is not greater than about 100:1. The ratio of alcohol to aldehyde in the preparation of the acetal is not critical as long as the reaction is carried to completion by distilling off the water. Ordinarily the ratio of alcohol to aldehyde will be kept within the limits of 2:1 to 10:1, however. When the formation of the acetal and its pyrolysis is carried out in one step, it is desirable to use a ratio of less than about 5:1 and it is preferable to use a ratio between about 1:1 and about 3:1.

Pressure may be used to maintain the liquid phase in these reactions when the temperatures are above the boiling points of the reagents. Inert gas such as carbon dioxide, methane, ethane, nitrogen, or hydrogen and the like may be used to provide pressure, if desired. Usually, however, the liquid state is maintained in a closed system by autogenic pressure of one or more of the reagents or products.

The reaction between the unsaturated aldehyde and the unsaturated alcohol to form the acetal does not require an added catalyst. The reaction is carried out in the absence of strong mineral acid catalysts and is preferably carried out in the absence of any added catalyst when the acetal is desired in the greatest possible yield. Organic carboxylic acids such as those normally present in the reagents and other carboxylic acids such as benzoic acid, oxalic acid, phthalic acid, and the like have a transitory catalytic effect at the beginning of the reaction, but they apparently esterify rapidly and are, therefore, not classified as catalysts within the scope of this invention.

In the one-step process for reacting the unsaturated aldehyde with the unsaturated alcohol to produce the alpha-alkenyl-substituted unsaturated aldehyde directly without isolation of the acetal of the unsaturated aldehyde, catalysts which are catalysts both for the formation of the acetal and for rearrangement of the acetal may be used in some instances if caution is exercised.

Operable catalysts include: Silica gel, magnesium aluminum silicates, weakly acidic clays, and alumina. These catalysts are also operable for accelerating the pyrolysis of the unsaturated acetal when the unsaturated acetal is pyrolyzed separately. When catalysts are used, lower temperatures and shorter contact times are required to avoid side reactions which include polymerization. Nevertheless, it is preferable not to use a catalyst. The advantage of avoiding the use of added catalysts in the reactions of this invention is that the reaction temperatures and reaction times do not need as careful control as under catalytic conditions.

In carrying out the process of acetal formation, the reaction is carried farther toward completion by continuous removal of the water. In carrying out the simultaneous acetal formation and pyrolysis, the water may also be removed continuously, but as pointed out hereinabove, the equilibrium in the acetal formation is favored by removal of the acetal by its pyrolysis and the removal of water is not necessary.

The alcohol formed in the pyrolysis may be removed continuously if desired or it may be separated at the completion of the pyrolysis. When removed continuously, the yield of alcohol may be used as a means of following the course of the reaction.

Since the unsaturated reagents and products formed in the process of this invention are polymerizable, polymerization conditions are preferably avoided. Air, for example, is preferably kept out of the system during the heating steps, and inert gas may be substituted therefor. Polymerization may be further inhibited by having present small amounts of polymerization inhibitors such as tertiary butyl catechol and the like with the reagents in the liquid phase reactions. The effect of inhibitors is more noticeable in the lower temperature range than in the higher.

The novel alkenyl-substituted unsaturated aldehydes of this invention are useful as chemical intermediates in the preparation of other compounds such as, for example, branched chain saturated or unsaturated alcohols by catalytic and chemical reduction reactions, and corresponding unsaturated acids by mild oxidation of the aldehydes. They are also useful for the preparation of copolymers with styrene, butadiene, methyl vinyl ketone, methyl methacrylate, and the like.

What I claim and desire to protect by Letters Patent is:

1. The method of producing an alkenyl-substituted unsaturated aldehyde of the formula

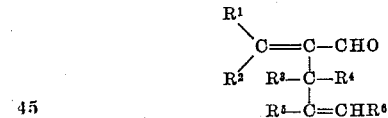

where the R groups are selected from the group consisting of hydrogen and alkyl radicals having 1 to 4 carbon atoms which comprises heating an acetal of the formula

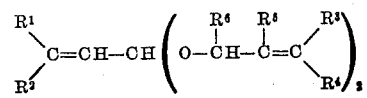

at a temperature within the range of about 150° C. and 300° C. and recovering said alkenyl-substituted unsaturated aldehyde.

2. The method of producing an alpha-alkenyl-substituted crotonaldehyde which comprises heating a diallyl acetal of crotonaldehyde at a temperature within the range of about 150° C. and about 300° C. and recovering said alpha-alkenyl-substituted crotonaldehyde.

3. The method of producing an alpha-alkenyl-substituted crotonaldehyde which comprises heating dimethallyl acetal of crotonaldehyde at a temperature within the range of about 150° C. and about 300° C. and recovering said alpha-alkenyl-substituted crotonaldehyde.

4. The method of producing an alpha-alkenyl-substituted crotonaldehyde which comprises heating bis(1,2-dimethylallyl) acetal of crotonaldehyde at a temperature within the range of about 150° C. and about 300° C. and recovering said alpha-alkenyl-substituted crotonaldehyde.

5. The method of producing an alkenyl-substituted unsaturated aldehyde of the formula

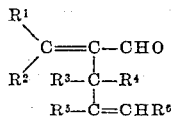

where the R groups are selected from the group consisting of hydrogen and alkyl radicals having 1 to 4 carbon atoms which comprises heating an aldehyde of the formula

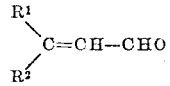

with an alcohol of the formula

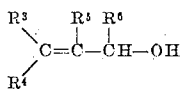

at a temperature within the range of about 80° C. and 140° C., and subsequently heating at a temperature within the range of about 150° C. and about 300° C., and recovering said alkenyl-substituted unsaturated aldehyde.

6. The method of producing an alkenyl-substituted unsaturated carbonyl compound of the formula

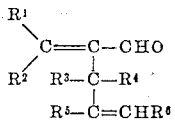

where the R groups are selected from the group consisting of hydrogen and alkyl radicals having 1 to 4 carbon atoms which comprises heating an unsaturated carbonyl compound of the formula

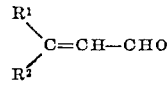

with an unsaturated alcohol of the formula

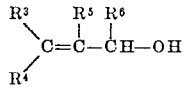

at a temperature within the range of about 150° C. and about 300° C., and recovering said alkenyl-substituted unsaturated carbonyl compound as a product.

ROBERT H. SAUNDERS.

REFERENCES CITED

The following references are of record in the file of this patent:

UNITED STATES PATENTS

| Number | Name | Date |
|---|---|---|
| 2,046,556 | Groll et al. | July 7, 1936 |
| 2,106,347 | Groll et al. | Jan. 25, 1938 |
| 2,321,557 | Sussman | June 8, 1943 |
| 2,387,366 | Toussaint | Oct. 23, 1945 |
| 2,446,171 | Croxall et al. | Aug. 3, 1948 |

OTHER REFERENCES

Ruzicka et al., Helv. Chim. Acta, vol. 18, pages 439–444, 1935.